(12) United States Patent
Kim (10) Patent No.: US 7,351,941 B2
(45) Date of Patent: Apr. 1, 2008

(54) APPARATUS AND METHOD FOR TRANSMITTING AND RECEIVING DATA IN MICROWAVE OVEN

(75) Inventor: Ji Woong Kim, Boosan-si (KR)

(73) Assignee: LG Electronics Inc., Seoul (KR)

( * ) Notice: Subject to any disclaimer, the term of this patent is extended or adjusted under 35 U.S.C. 154(b) by 396 days.

(21) Appl. No.: 10/806,143

(22) Filed: Mar. 23, 2004

(65) Prior Publication Data

US 2005/0011886 A1    Jan. 20, 2005

(30) Foreign Application Priority Data

Jul. 16, 2003 (KR) .................. 10-2003-0048902

(51) Int. Cl.
*H05B 6/66* (2006.01)
*H05B 6/50* (2006.01)

(52) U.S. Cl. ..................... 219/702; 219/713

(58) Field of Classification Search ............ 219/702, 219/703, 704, 705, 706, 707, 708, 709, 710, 219/711, 712, 713; *H05B 6/66, 6/50*
See application file for complete search history.

(56) References Cited

U.S. PATENT DOCUMENTS

| 6,137,095 | A * | 10/2000 | Kashimoto et al. | 219/702 |
|---|---|---|---|---|
| 6,359,270 | B1 * | 3/2002 | Bridson | 219/679 |
| 6,681,137 | B1 * | 1/2004 | Drucker et al. | 700/15 |
| 6,936,802 | B2 | 8/2005 | Ishikawa et al. | 219/702 |
| 6,949,729 | B1 * | 9/2005 | Ishikawa et al. | 219/702 |
| 7,069,091 | B2 | 6/2006 | Williamson | 700/90 |
| 7,092,988 | B1 * | 8/2006 | Bogatin et al. | 709/203 |

FOREIGN PATENT DOCUMENTS

| CN | 1271829 | 11/2000 |
|---|---|---|
| EP | 1041860 A3 | 10/2004 |
| JP | 11-088965 | 3/1999 |
| JP | 2003-006426 | 1/2003 |

* cited by examiner

*Primary Examiner*—Daniel Robinson
(74) *Attorney, Agent, or Firm*—Birch, Stewart, Kolasch & Birch, LLP (57) ABSTRACT

The invention relates to an apparatus and method for data transmitting/receiving between a microwave oven and an information appliance PDA. The apparatus includes a wireless data transmitting/receiving unit for conducting wireless data communication with an external system including an information appliance; a data storage unit for storing transmitted/received data through the wireless data transmitting/receiving unit and/or downloaded data from Internet; a display unit for displaying transmitted data from the wireless data transmitting/receiving unit; a load drive unit for driving a magnetron and/or a heater; and Micom interfaced with the above elements, and interpreting the transmitted data from the wireless data transmitting/receiving unit and/or checking a state of the microwave oven, and controlling the wireless data transmitting/receiving unit to transmit the data on the state of the microwave oven to an information appliance. According to the invention, although the microwave oven does not include built-in networked communication equipment like a modem, it can interface with Internet through an information appliance, a PDA for example, which download data and transmits to the microwave oven. Thus, increase in price of the microwave oven with the modem is minimized and user interface is provided. Also, repair cost of the microwave oven can be minimized by checking the microwave based on the data on the internal state of the microwave being transmitted to the PDA.

4 Claims, 6 Drawing Sheets

APPARATUS AND METHOD FOR TRANSMITTING AND RECEIVING DATA IN MICROWAVE OVEN

This Non-provisional application claims priority under 35 U.S.C. § 119(a) on Patent Application No(s). 10-2003-0048902 filed in Korea on Jul. 16, 2003, the entire contents of which are hereby incorporated by reference.

BACKGROUND OF THE INVENTION

1. Field of the Invention

The present invention relates to a microwave oven and an information appliance like a PDA for transmitting/receiving data. More specifically, the present invention relates to an apparatus and method for transmitting and receiving data in a microwave oven, in which a PDA with a data transmitting/receiving function downloads data over the network like Internet and transmits the data to the microwave oven where food is cooked based on the transmitted data, and if necessary, the state of the microwave oven is transmitted to the information appliance, i.e. the PDA.

2. Discussion of the Background Art

In general, microwave ovens are cooking appliances, which heat and eventually cook food through microwaves output from a magnetron.

To ensure a precise control over the cooking in the microwave oven, an infrared sensor is usually used. The infrared sensor is installed at one side of a cooking cavity, to trace the food to be cooked by detecting a temperature change on the surface of the food and to transmit the temperature information to a microprocessor inside of the microwave oven. Then, based on the detected surface temperature of the food to be cooked, the microprocessor determines cooking and control conditions.

Figure 1:
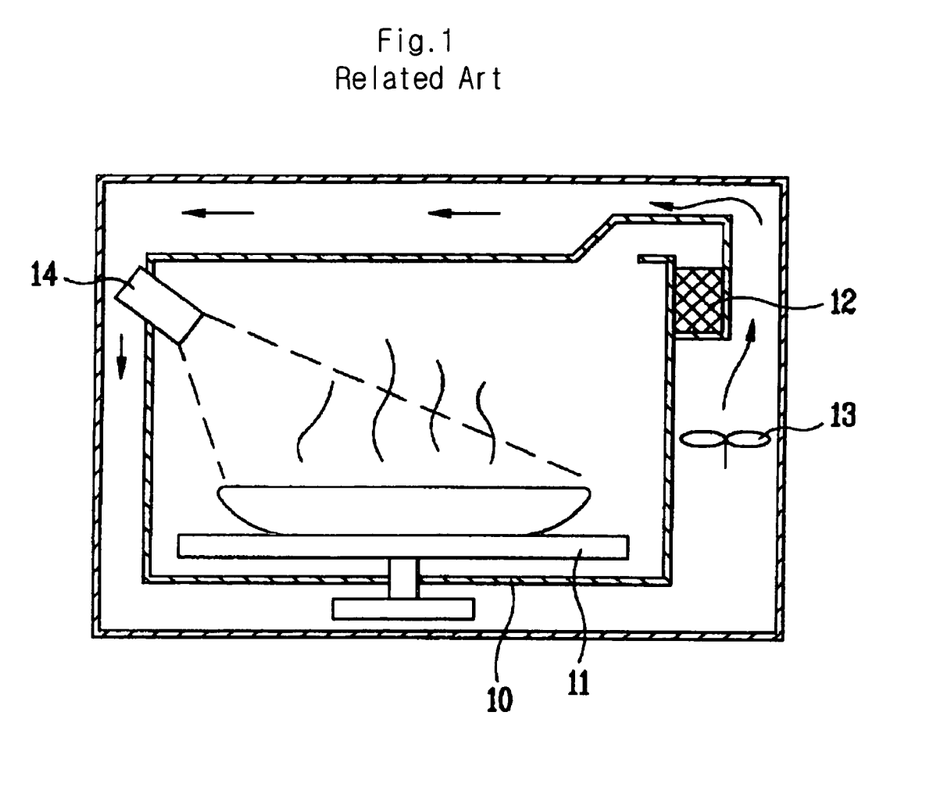
FIG. 1 illustrates a related art microwave oven.

As shown in FIG. 1, a related art microwave oven includes a turntable 11 on which food to be cooked is mounted; a magnetron 12 for generating electromagnetic waves, the electromagnetic waves being incident on the food inside of a cooking cavity 10 through a waveguide; a cooling fan 13 for cooling the heated magnetron 12; and an infrared sensor 14 for detecting the temperature of the food to be cooked.

The microwave oven with the above-described constitution operates as follows.

When a user inputs a cooking command, a controller (not shown) drives the magnetron 12.

Then the electromagnetic waves generated from the magnetron 12 are irradiated to the cavity 10 through the waveguide, and the food to be cooked is heated.

The infrared sensor 14 outputs different voltage values according to the temperature of the food to be cooked, ad the values are applied to the controller via a series of signal processes.

Therefore, the controller drives the magnetron 12 to heat the food to be cooked until the temperature of the food reaches a target temperature.

Also, the cooling fan 13 cools the heated magnetron 12 while the food is being cooked.

Figure 2:
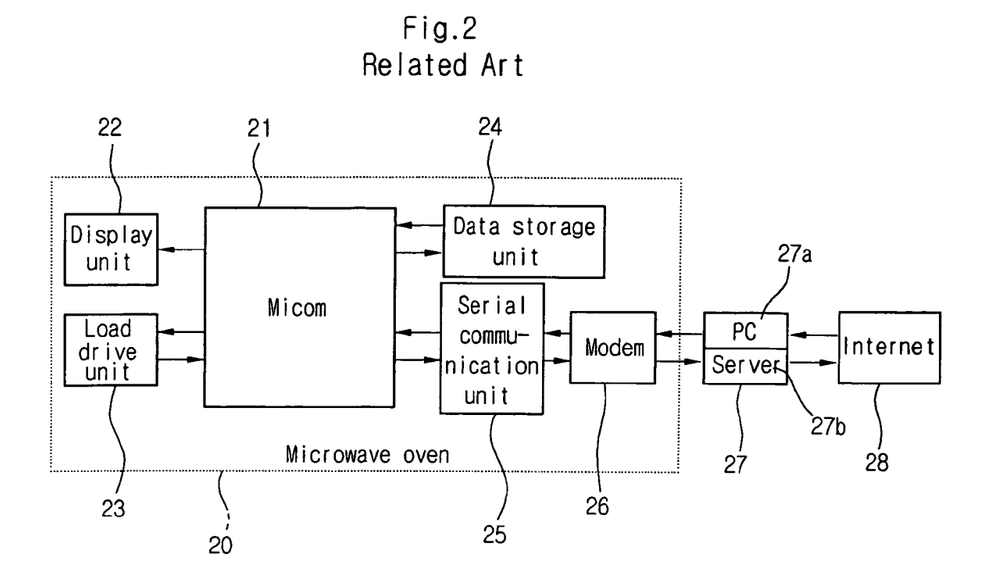
FIG. 2 is a block diagram illustrating the structure of a data transmitting/receiving microwave oven according to a related art.

FIG. 2 is a block diagram illustrating the structure of a data transmitting/receiving microwave oven 20 according to a related art.

As shown in FIG. 2, the data transmitting/receiving microwave 20 includes a display 22 for displaying data to be announced to a user; a load drive unit 23 for driving loads of magnetron and heater; a modem 26 for accessing the microwave oven to an outside media 27, a PC 27a or a server 27b for example; a serial communication unit 25 for conducting a serial communication with the modem 26; a data storage unit 24 for storing data received through the serial communication unit 25; and Micom 21 interfaced with the above elements and controlling them.

In short, the modem 26 and the serial communication unit 25 built in the related art data transmitting/receiving microwave oven 20 make possible to access to the PC 27a or the server 27b, thereby transmitting and receiving data.

However, the modem 26 or the serial communication unit 25 built in the related art data transmitting/receiving microwave oven contributed to an increase in price of the microwave oven.

Moreover, data transmitting/receiving between the PC 27a or the server 27b and the modem in the microwave oven was conducted only through the wire system. Further, the PC 27a or the server 27b received data over discrete Internet 28, and conducted data communication with the microwave oven

SUMMARY OF THE INVENTION

An object of the invention is to solve at least the above problems and/or disadvantages and to provide at least the advantages described hereinafter.

Accordingly, one object of the present invention is to solve the foregoing problems by providing a microwave oven with a wireless data transmitting/receiving unit for conducting wireless data communication with a data transmitting/receiving information appliance, whereby the microwave oven can display transmitted/received data and cook the food based on the data.

Another object of the present invention is to provide a microwave control system for displaying the state of the microwave oven and transmitting the data on the state of the microwave oven, whereby a user does not have to disassemble the microwave to find out whether the microwave needs to be repaired.

Another object of the invention is to provide a microwave oven capable of receiving wirelessly a program for use in the microwave oven from a wireless data transmitting/receiving information appliance, a PDA for example, the program being downloaded from Internet, and a communication method between the microwave oven and the information appliance.

The foregoing and other objects and advantages are realized by providing an apparatus for transmitting and receiving data in a microwave oven having a data transmitting/receiving function from an external system, the apparatus including: a wireless data transmitting/receiving unit for conducting wireless data communication with an external system including an information appliance; a data storage unit for storing transmitted/received data through the wireless data transmitting/receiving unit and/or downloaded data from Internet; a display unit for displaying transmitted data from the wireless data transmitting/receiving unit; a load drive unit for driving a magnetron and/or a heater; and Micom interfaced with the wireless data transmitting/receiving unit, the data storage unit, the display unit, and the load drive unit, and interpreting the transmitted data from the wireless data transmitting/receiving unit and/or checking a state of the microwave oven, and controlling the wireless data transmitting/receiving unit to transmit the data on the state of the microwave oven to an information appliance.

Another embodiment of the invention provides an apparatus for transmitting and receiving data in a microwave oven comprises a data transmitting/receiving system with the microwave oven, wherein the system is comprised of a wireless data transmitting/receiving information appliance that is operated by a user, the information appliance having access to Internet; and an intermediate medium PC or server for interfacing the information appliance with the Internet.

According to another embodiment of the invention, a method for transmitting and receiving data in a microwave oven includes the steps of: installing at a data transmitting/receiving information appliance a program to be communicated with the microwave; receiving data in the information appliance over network or a server; transmitting the received data to the microwave oven; storing and/or displaying the received data; and cooking, in the microwave oven, food based on the received data.

According to another embodiment of the invention, a method for transmitting and receiving data between data transmitting/receiving microwave oven and information appliance includes the steps of: displaying on the microwave oven or the information appliance data on a state of the microwave oven at a user's request or according to the state of the microwave oven; and determining the state of the microwave oven on the basis of the displayed data.

The microwave oven and data communication method thereof can be advantageously used in that the microwave is capable of interfacing with Internet through an information appliance, a PDA for example, without requiring a built-in Internet communication equipment like a modem, and receiving wirelessly a data that is specially formatted to be transmitted and received over the Internet. Therefore, increase in price of the microwave oven with the communication equipment is minimized, and a user interface is provided.

Moreover, no matter how difficult or complicate the disassembly or installation of the microwave ovens like OTR (Over the Range) or built-in model is, the internal state of the microwave oven can be diagnosed based on the data on the state of the microwave oven being transmitted to the information appliance, namely the PDA. Accordingly, repair cost of the microwave can be minimized and users' convenience is increased.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present an apparatus and method for transmitting and receiving data in a microwave oven according to a preferred embodiment of the invention in reference to the accompanying drawings.

Figure 3:
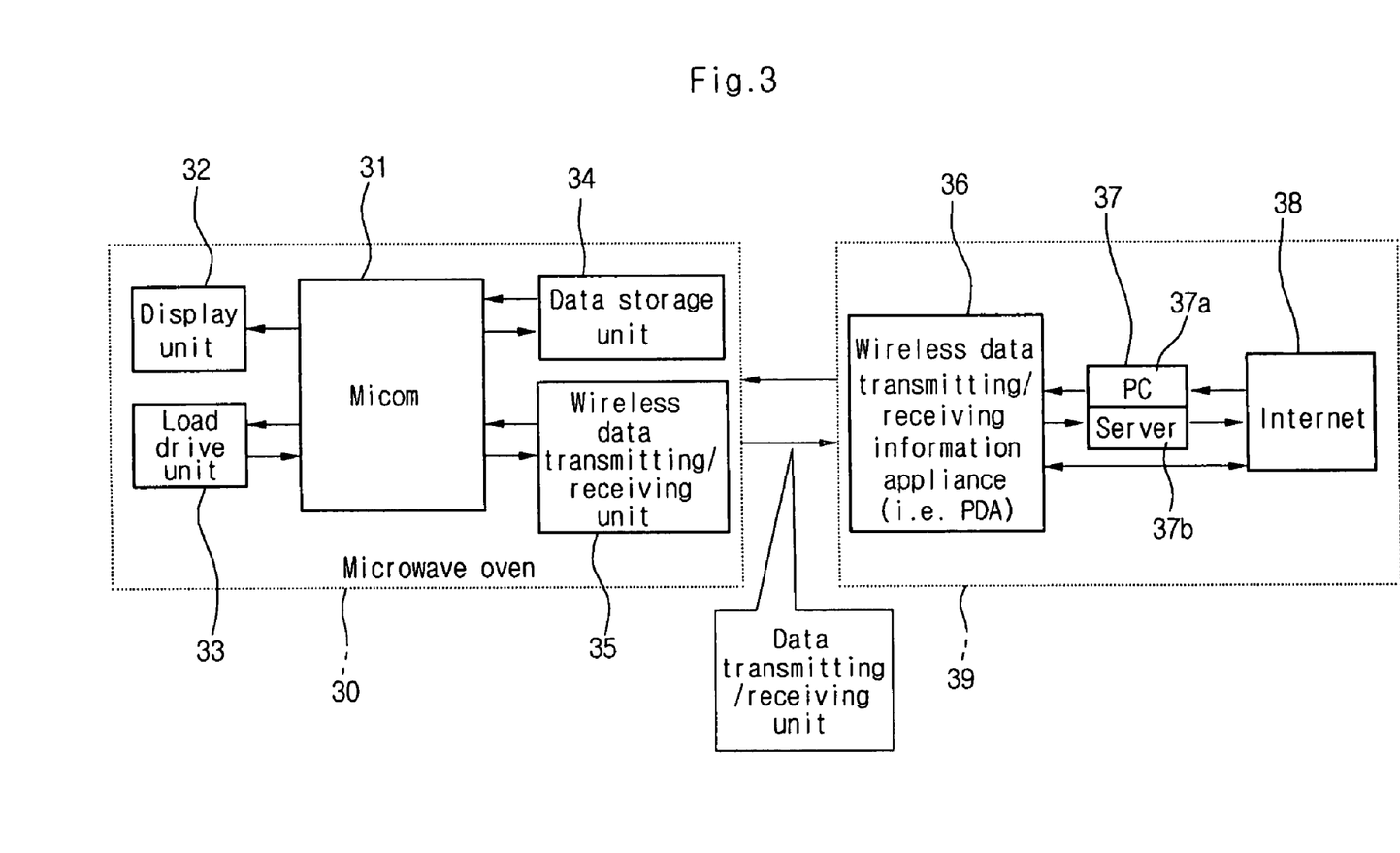
FIG. 3 is a block diagram illustrating the structure of a microwave oven for transmitting/receiving data according to the present invention.

FIG. 3 is a block diagram illustrating the structure of a microwave oven for transmitting/receiving data to/from an information appliance, according to the present invention.

As depicted in FIG. 3, in addition to the elements of the related art microwave oven in FIG. 2, the wireless data transmitting/receiving microwave oven 30 further includes a wireless data transmitting/receiving unit 35 for transmitting/receiving data wirelessly, and a data storage unit 34 for storing transmitted/received data through the wireless data transmitting/receiving unit 35, or downloaded data.

As shown in FIG. 3, the data transmitting/receiving microwave oven 30 of the present invention includes a display unit 32 for displaying transmitted data through the wireless data transmitting/receiving unit 35, and a load drive unit 33 for driving loads of magnetron and heater.

Also, the microwave oven 30 according to the present invention includes Micom 31 interfaced with the wireless data transmitting/receiving unit 35, the data storage unit 34, the display unit 32, and the load drive unit 33, and controlling these elements.

The Micom 31 interprets the transmitted data through the wireless data transmitting/receiving unit 35 and controls the elements based on the data interpretation. Also, the Micom 31 checks a present internal state of the microwave oven, and controls the transmitting/receiving unit 35 to transmit the data on the present internal state of the microwave oven to an information appliance, i.e. PDA.

Therefore, with the help of the wireless data transmitting/receiving unit 35, the microwave oven of the present invention is capable of conducting wireless data communication with a wireless data transmitting/receiving system 39 via the information appliance.

The wireless data transmitting/receiving system 39 includes an information appliance like the PDA 36 operated by a user for conducting wireless data transmission/receiving, and a PC 37a or a server 37b functioning as an intermediate medium 37 being accessed to the information appliance for data communication. The intermediate medium 37 downloads data on different specifications of microwave ovens over Internet 38.

The information appliance 36, with an application of the downloaded program, transmits the data to the wireless data transmitting/receiving unit 35 of a related microwave oven 30, and the Micom 31 either stores the transmitted data in the data storage unit 34 or displays the data on the display unit 32.

In this manner, the user can download all data information necessary for cooking, different recipes or specific cooking information in a large capacity for example, with the help of a user interface.

Also, the Micom 31 checks user's requests or the present state of the microwave oven periodically or aperiodically, and transmits the related information to the information appliance 36 (e.g., the PDA) through the wireless data transmitting/receiving unit 35. Then the display unit 32, under the control of the Micom 31, displays the present internal state of the microwave oven to the information appliance 36.

The displayed data on the information appliance 36 or the transmitted data from the microwave oven is transmitted to the networked PC 37a or server 37b for information interchange. Thus, the state of the microwave oven can easily be diagnosed or checked without disassembling the inside of the microwave oven.

Meanwhile, as shown in FIG. 3, the information appliance PDA 36 can download cooking related data or necessary programs for the microwave oven directly over the Internet 38.

The operation of the microwave oven 30 is controllable by the PDA also. In other words, the user can transmit a control command to the microwave oven using the data transmitting/receiving PDA, and manipulate the microwave oven to cook the food the user wants.

Figure 4:
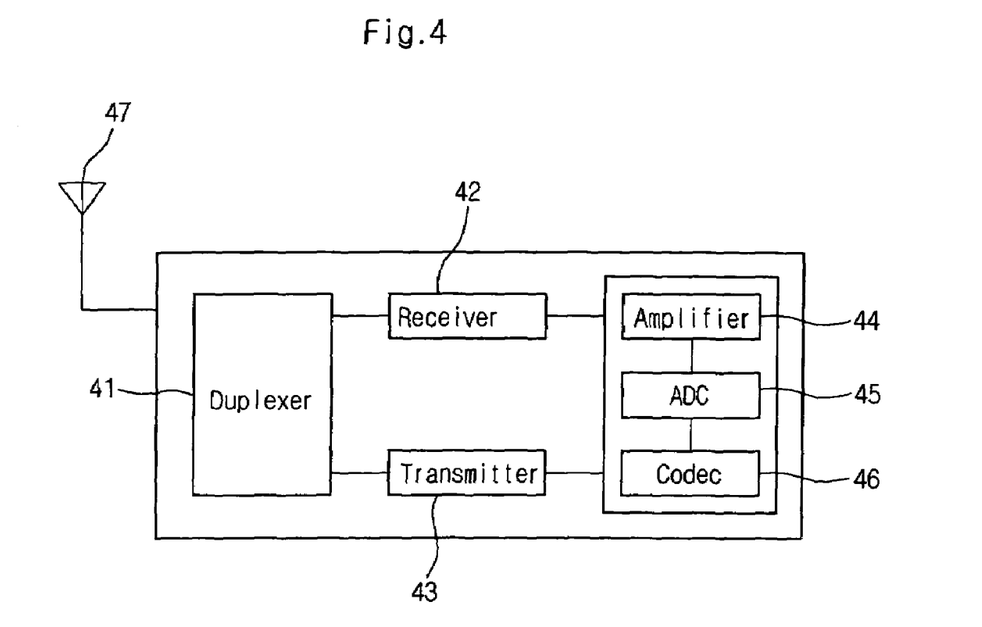
FIG. 4 illustrates an internal configuration of a transmitting/receiving unit for data transmitting/receiving according to the present invention.

FIG. 4 illustrates the internal configuration of the transmitting/receiving unit in FIG. 3 for wireless data transmitting/receiving.

To briefly explain, the transmitting/receiving unit includes an antenna 47 for used in data transmitting/receiving; a duplexer 41 for duplexing the antenna state according to whether data needs to be transmitted or received; a transmitter 43/a receiver 42, separated by the duplexer 41; an amplifier 44 for amplifying the transmitted/received data; an ADC 45 for converting data; and a Codec 46.

Figure 5:
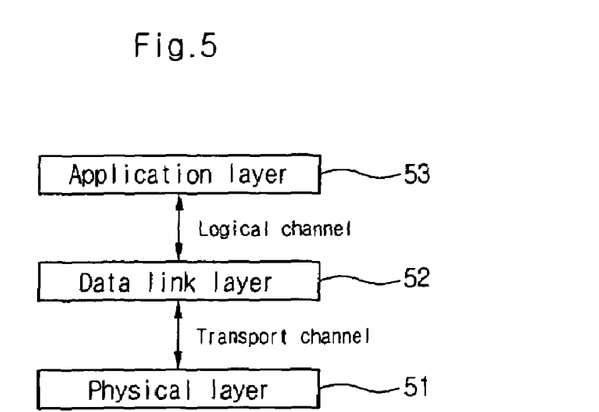
FIG. 5 illustrates a communication protocol hierarchy diagram between an information appliance and a microwave oven for conducting wireless data communication according to the present invention.

FIG. 5 illustrates a communication protocol hierarchy diagram between the information appliance and the microwave oven for conducting wireless data communication, according to the present invention. In general, an international standard layer (e.g., OSI 7 layers) is used.

As shown in FIG. 5, inter layer communication is conducted between three independent layers, namely application layer, data link layer, and physical layer.

More specifically speaking, the protocol layers in FIG. 5 can be divided into a first layer (51), a second layer (52), and a third layer (53), on the basis of the well-known three low layers of OSI (Open System Interface: OSI) standard model in communication system.

The first layer (51) functions as a PHY (physical layer) for air interface, and is connected to an upper layer through a transfer channel.

When data is transmitted to the PHY through the transport channel, the data is subject to diverse coding and modulation systems appropriate for a wireless environment before the data is transmitted to a receiver.

The second layer (52) functions as a data link layer. Many appliances share resources in the system network.

The third layer (53) is in charge of control over the transport channel and physical channels, in connection with set up, reset and release of wireless carriers.

The physical layer 51 includes a data communication means for conducting wireless data transmitting/receiving between the information appliance, such as the user's PDA, and the microwave oven; and a data storage means (a part of the Micom internal memory or an extra memory) for storing data downloaded by the data communication means.

As for the data communication means, a bluetooth module can be used, which conducts bluetooth communication between the information appliance and the microwave oven through a master/a slave.

The application layer interprets the data received from the physical layer and processes the data, and produces data information to be transmitted to the physical layer.

The data information which the application layer transmits/receives includes a message in relation to load control on time, temperature and output for a cook recipe, or memory control method; a message in relation to a control method that is not pre-designated in the microwave oven and a screen; and a necessary message for transmitting information on the internal state of the microwave oven to the information appliance PDA.

The application layer corresponds to the Micom 35 in FIG. 3.

In addition, the data link layer constructs a packet by using the data information transmitted from the application layer, and transmits the packet to the physical layer. Or the data link layer processes a packet transmitted from the physical layer, and transmits the processed packet to the application layer.

The data link layer corresponds to the interface between the Micom 31, the data storage unit 34, and the wireless data transmitting/receiving unit 35.

The data is interfaced in a message unit between the application layer and the data link layer, while the data is interfaced in a full packet unit between the data link layer and the physical layer.

Also, data transmitting/receiving between the microwave oven and the information appliance (i.e. the PDA) is performed on the basis of ACK or NAK system, in which a data transmitting side transmits only one packet of data, and a data receiving side sends an ACK or NAK signal as a response.

Figure 6:
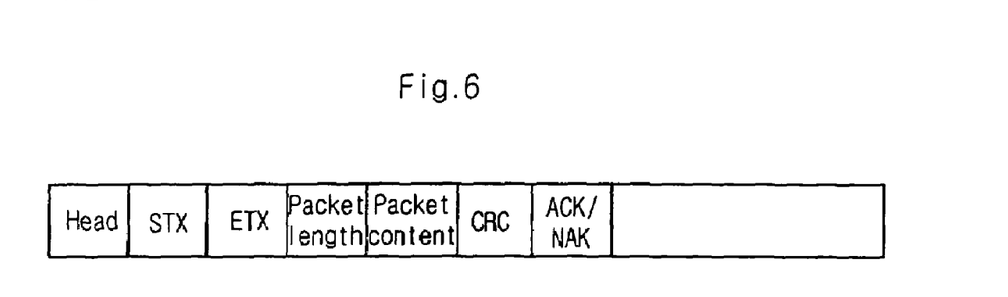
FIG. 6 illustrates a packet data structure being transmitted/received according to the present invention.

FIG. 6 illustrates an exemplary embodiment of packet data for use in data transmitting/receiving between the microwave oven and the information appliance PDA.

Referring to FIG. 6, the packet data includes a head containing information about data characteristics or the transmitting and receiving sides, STX (Start of text), ETX (End of text), packet length, packet content, flag, CRC for checking errors, message command code, ACK/NAK and so forth.

Figure 7:
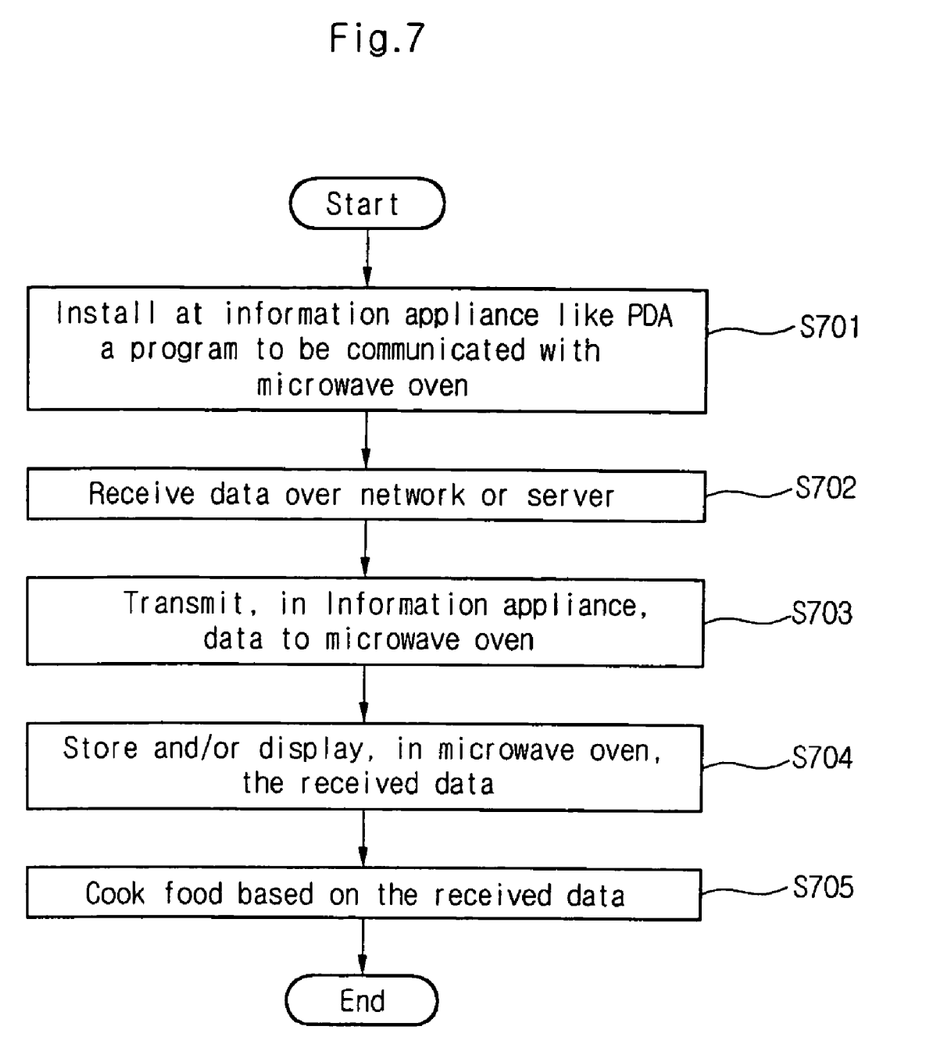
FIG. 7 is a flow chart illustrating data transmission from an information appliance to a microwave oven according to the present invention.

FIG. 7 is a flow chart describing data transmission from the information appliance to the microwave oven.

Referring to FIG. 7, a program to be communicated with the microwave oven is installed in the data transmitting/receiving information appliance (S701).

Since the program is communicated with each microwave oven, the program can be stored or downloaded from the outside over the Internet.

The information appliance receives the data or the program directly over the Internet or through the server (S702).

The received data is transmitted to the microwave oven (S703).

In the microwave oven, the received data is either stored and/or displayed, and using the displayed data, the microwave oven cooks the food (S704 and S705).

Using the received data to the microwave oven, it is possible to control the microwave oven.

Figure 8:
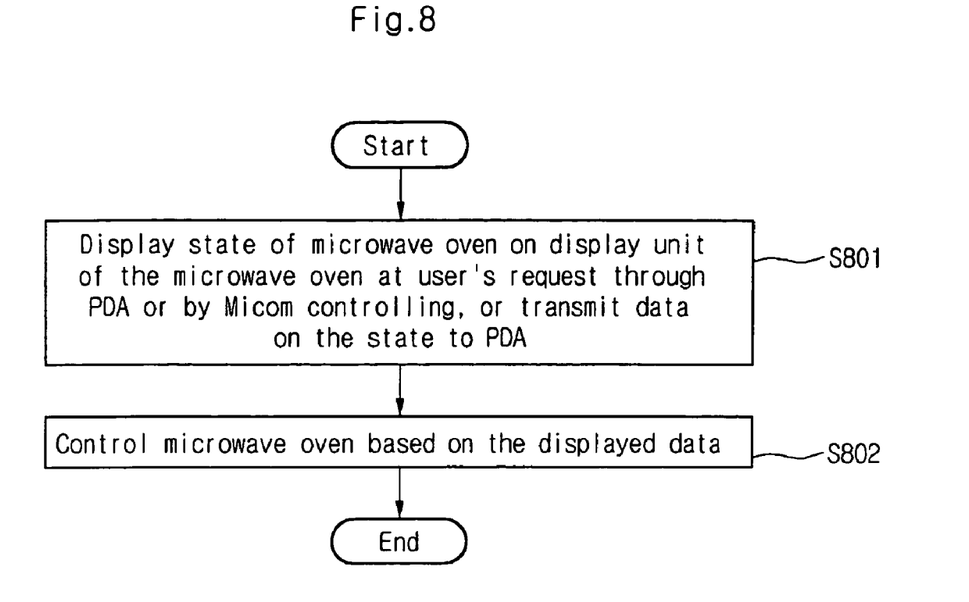
FIG. 8 is a flow chart illustrating data transmission from a microwave oven to an information appliance according to the present invention.

FIG. 8 is a flow chart illustrating data transmission from the microwave oven to the information appliance.

The present state of the microwave oven is transmitted to the information appliance at a user's request or according to the state of the microwave oven, and the information is displayed on the information appliance (S801).

Using the displayed information, it is possible to check the internal state of the microwave oven, and if necessary, the microwave oven is repaired (S802).

The information about the state of the microwave oven is transmitted periodically or aperiodically.

In conclusion, the data transmitting/receiving system in the microwave oven receives data from the data transmitting/receiving information appliance, namely the PDA, wherein the PDA downloaded the data over the Internet, and displays the data. On the basis of the data, the microwave oven cooks the food, and if necessary, the data on the state of the microwave oven is transmitted to the information appliance.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for transmitting and receiving data in a microwave oven having a data transmitting/receiving function from an external system, the apparatus comprising:
    a wireless data transmitting/receiving unit for conducting wireless data communication with an external system including an information appliance;
    a data storage unit for storing transmitted/received data through the wireless data transmitting/receiving unit and/or downloaded data from Internet;
    a display unit for displaying transmitted data from the wireless data transmitting/receiving unit;
    a load drive unit for driving a magnetron and/or a heater; and
    Micom interfaced with the wireless data transmitting/receiving unit, the data storage unit, the display unit, and the load drive unit, and interpreting the transmitted data from the wireless data transmitting/receiving unit and/or checking a state of the microwave oven, and controlling the wireless data transmitting/receiving unit to transmit the data on the state of the microwave oven to an information appliance.

2. An apparatus for transmitting and receiving data in a microwave oven, the apparatus comprising:
    a physical layer having a data communication means for transmitting and receiving data wirelessly between an information appliance and the microwave oven, and a data storage means for storing data downloaded by the data communication means;
    an application layer for interpreting and processing data information received from the physical layer, and producing data information to be transmitted to the physical layer; and
    a data link layer for configuring at least a packet by using the data information transmitted from the application layer, and transmitting the packet to the physical layer, and/or processing the packet transmitted from the physical layer, so that the packet is transmitted to the application layer.

3. The apparatus according to claim 2, wherein the data information the application layer transmits and receives is comprised of at least one of a message in relation to load control on time, temperature and output for a cooking recipe, or memory control method; a message for a control method that is not pre-designated in the microwave oven and a screen; and a necessary message for transmitting information on the internal state of the microwave oven to the information appliance.

4. The apparatus according to claim 2, wherein the data communication means is a Bluetooth module for providing Bluetooth communication between the information appliance and the microwave oven.

* * * * *